(12) United States Patent
Zhong et al.

(10) Patent No.: US 11,865,507 B1
(45) Date of Patent: Jan. 9, 2024

(54) INTELLIGENT TEMPERATURE CONTROL EQUIPMENT FOR PREPARATION OF LIQUID SODIUM METHOXIDE

(71) Applicant: HENAN SHENGHONGFENG CHEMICAL CO., LTD., Kaifeng (CN)

(72) Inventors: Youzheng Zhong, Kaifeng (CN); Weiwei Chen, Kaifeng (CN); Yan Song, Kaifeng (CN); Zhenyi Song, Kaifeng (CN); Gaoying Duan, Kaifeng (CN); Changguang Song, Kaifeng (CN); Juanjuan Pan, Kaifeng (CN); Yingying Song, Kaifeng (CN)

(73) Assignee: HENAN SHENGHONGFENG CHEMICAL CO., LTD., Kaifeng (CN)

( * ) Notice: Subject to any disclaimer, the term of this patent is extended or adjusted under 35 U.S.C. 154(b) by 0 days.

(21) Appl. No.: 18/457,393

(22) Filed: Aug. 29, 2023

(30) Foreign Application Priority Data

Aug. 29, 2022 (CN) .......................... 202211042420.7

(51) Int. Cl.
*B01J 19/00* (2006.01)
*B01J 19/30* (2006.01)

(52) U.S. Cl.
CPC .......... *B01J 19/0013* (2013.01); *B01J 19/30* (2013.01); *B01J 2219/00096* (2013.01); *B01J 2219/00132* (2013.01); *B01J 2219/00139* (2013.01)

(58) Field of Classification Search
CPC .................... B01J 19/30; B01J 19/0013; B01J 2219/00096; B01J 2219/00132; B01J 2219/00139

USPC ................................. 422/138, 186, 201, 202
See application file for complete search history.

(56) References Cited

U.S. PATENT DOCUMENTS

| 2015/0142204 A1 | 5/2015 | Wang et al. |
| 2019/0315463 A1 | 10/2019 | Chen et al. |
| 2020/0231304 A1 | 7/2020 | Puig Oliveras |

FOREIGN PATENT DOCUMENTS

CN 214243811 U * 9/2021

OTHER PUBLICATIONS

Partial Translation of CN 214243811 U (Year: 2021).*
CNIPA, Notification of First Office Action for Chinese application CN202211042420.7, dated Jul. 4, 2023.
CNIPA, Notification to grant patent right for Chinese application CN202211042420.7, dated Jul. 21, 2023.

* cited by examiner

*Primary Examiner* — Charles S Bushey
(74) *Attorney, Agent, or Firm* — Zhigang Ma

(57) ABSTRACT

The present invention discloses intelligent temperature control equipment for the preparation of liquid sodium methoxide, and belongs to the technical field of temperature control equipment. The intelligent temperature control equipment sequentially includes a feeding hopper, a throat pipe, a shunting hood, a second shell and a third shell which are sequentially connected from top to bottom, wherein a first coil pipe, a second coil pipe and a third coil pipe are mounted on the outer sides of the feeding hopper, the second shell and the third shell, respectively; a discharging pipe is connected to the bottom of the third shell, and a plurality of air inlet pipes is mounted on one side of the discharging pipe; corrugated packing is disposed on the inner side of the second shell.

10 Claims, 4 Drawing Sheets

INTELLIGENT TEMPERATURE CONTROL EQUIPMENT FOR PREPARATION OF LIQUID SODIUM METHOXIDE

TECHNICAL FIELD

The present invention relates to a temperature control device for the preparation of sodium methoxide, in particular to intelligent temperature control equipment for the preparation of liquid sodium methoxide, which belongs to the technical field of temperature control equipment.

BACKGROUND

Liquid sodium methoxide, which is a colorless or yellowish viscous liquid and sensitive to oxygen, is a flammable and explosive product, is very easy to absorb moisture, and thus mainly used in the industries of pesticide production and oil processing, and also as analytical reagents for the production of spices and fuels. However, liquid sodium methoxide refers to a methanol solution of sodium methoxide with sodium methoxide content of 27.5% to 30%. The liquid sodium methoxide may be generally prepared in two preparation methods, i.e., an alkali process and a sodium process. In the preparation method of alkali process, methanol and a sodium hydroxide solution are generally mixed fully to form a methyl alkali solution, the methyl alkali solution which is injected from the top of a reaction tower and flows from top to bottom and methanol vapor which is injected from the inner side of the reaction tower and flows from bottom to top fully react to prepare liquid sodium methoxide. During the reaction process, a bottom temperature of the reaction tower needs to be maintained at 95 to 110° C., and an interlayer temperature of the reaction tower is 85 to 100° C. However, the existing reaction tower is only to inject methanol vapor into the reacted mixed solution. The methanol vapor once it leaves the mixture neither ensures a temperature required for its reaction, nor achieves secondary mixing with the mixed solution, resulting in a low utilization rate of methanol vapor.

In view of the above shortcomings, how to develop intelligent temperature control equipment for the preparation of liquid sodium methoxide that can maintain the temperature of reaction with the mixed liquid after the methanol vapor leaves the mixed liquid for secondary mixing to further increase the utilization rate of methanol vapor is an urgent problem to be solved.

SUMMARY

A main object of the present invention is to provide intelligent temperature control equipment for the preparation of liquid sodium methoxide, in order to overcome the defects of the existing reaction tower in which methanol vapor once it leaves a mixed solution, neither maintains a temperature required for its reaction, nor achieves secondary mixing with the mixed solution, resulting in a low utilization rate of methanol vapor.

The object of the present invention may be achieved by the following technical solutions.

Intelligent temperature control equipment for the preparation of liquid sodium methoxide sequentially includes a feeding hopper, a throat pipe, a shunting hood, a second shell and a third shell which are sequentially connected from top to bottom, wherein a first coil pipe, a second coil pipe and a third coil pipe are mounted on the outer sides of the feeding hopper, the second shell and the third shell, respectively; a discharging pipe is connected to the bottom of the third shell, and a plurality of air inlet pipes is mounted on one side of the discharging pipe; corrugated packing is disposed on the inner side of the second shell; a mounting disc is mounted on the inner side of the third shell, and a plurality of water pumps is mounted on the top of the mounting disc; a mounting rod is disposed on the inner side of each of the plurality of water pumps; a mounting block is rotatably connected to the top of each mounting rod; a plurality of umbrella-shaped shunting hoods is connected to the outer side of each mounting block through a connecting rod; each shunting hood includes a baffle plate and a plurality of uniformly distributed arc fan plates located at the bottom of the baffle plate; and an electric heating film is mounted at the top of each arc fan plate.

As a further solution of the present invention, a bottom temperature box is mounted at the bottom of the third shell; the discharging pipe and the air inlet pipes are both disposed to penetrate through the bottom temperature box; a plurality of electric heating rings which is located on the outer sides of the air inlet pipes is mounted on the inner side of the bottom temperature box; and the electric heating rings are interconnected to the bottom of the inner wall of the bottom temperature box through a plurality of second connecting blocks.

As a further solution of the present invention, an electromagnetic valve is respectively mounted on each of the air inlet pipes and the discharging pipe.

As a further solution of the present solution, a top plate is mounted on the top of the feeding hopper, the corrugated packing is connected to the top of the top plate, and an air outlet pipe is disposed on one side of the corrugated packing.

As a further solution of the present invention, the inner wall of the feeding hopper is provided with a plurality of evenly distributed annular heat dissipation ribs.

As a further solution of the present invention, a motor is mounted on the inner side of the throat pipe; the motor is interconnected to the inner wall of the throat pipe through a plurality of third connecting blocks; a first connecting block in an inverted circular truncated cone shape is connected to an output end of the motor; a plurality of evenly distributed blades is connected to the outer side of the first connecting block; a perforated plate is connected to the bottom of each blade; and the blades and the perforated plate are each provided with a plurality of uniformly distributed circular holes.

As a further solution of the present invention, a shunting block in a circular truncated cone shape is disposed on the inner side of the shunting hood and tightly clung to the top of the corrugated packing; a plurality of evenly distributed shunting pipes is disposed on the inner side of the shunting block; and a vent valve interconnected with the outermost shunting pipe is disposed on the top of the shunting block; and a plurality of evenly distributed liquid inlet holes is formed in the inner side of the vent valve.

As a further solution of the present invention, a bearing interconnected to the bottom of the mounting block is mounted on each mounting rod.

As a further solution of the present invention, a plurality of supporting legs is mounted at the bottom of the bottom temperature box, and a ballasting plate is mounted at the bottom of each supporting leg.

As a further solution of the present invention, mounting lugs are disposed at the bottom of each water pump; mounting seats which cooperate with the mounting lugs each other are mounted on the mounting disc; and the mounting lugs and the mounting seats are connected to each other through fastening bolts.

The present invention has the following beneficial technical effects: in the intelligent temperature control equipment for the preparation of liquid sodium methoxide according to the present invention, due to the arrangement of the water pumps and the shunting hood, the water pumps can be used to perform secondary spraying on the mixed solution, and then the mixed solution is dispersively splashed to the lower side of the corrugated packing by the shunting hood, such that the deficiency that methanol vapor once it leaves the mixed solution cannot undergo a secondary reaction with the mixed solution is solved, thereby increasing a utilization rate of methanol. The sprayed mixed solution can be heated again by disposing the electric heating films, thereby ensuring a temperature required for reaction. The third coil is disposed to further maintain the temperature on the inner side of the third shell, which promotes the stable progress of the reaction.

Figure 1:
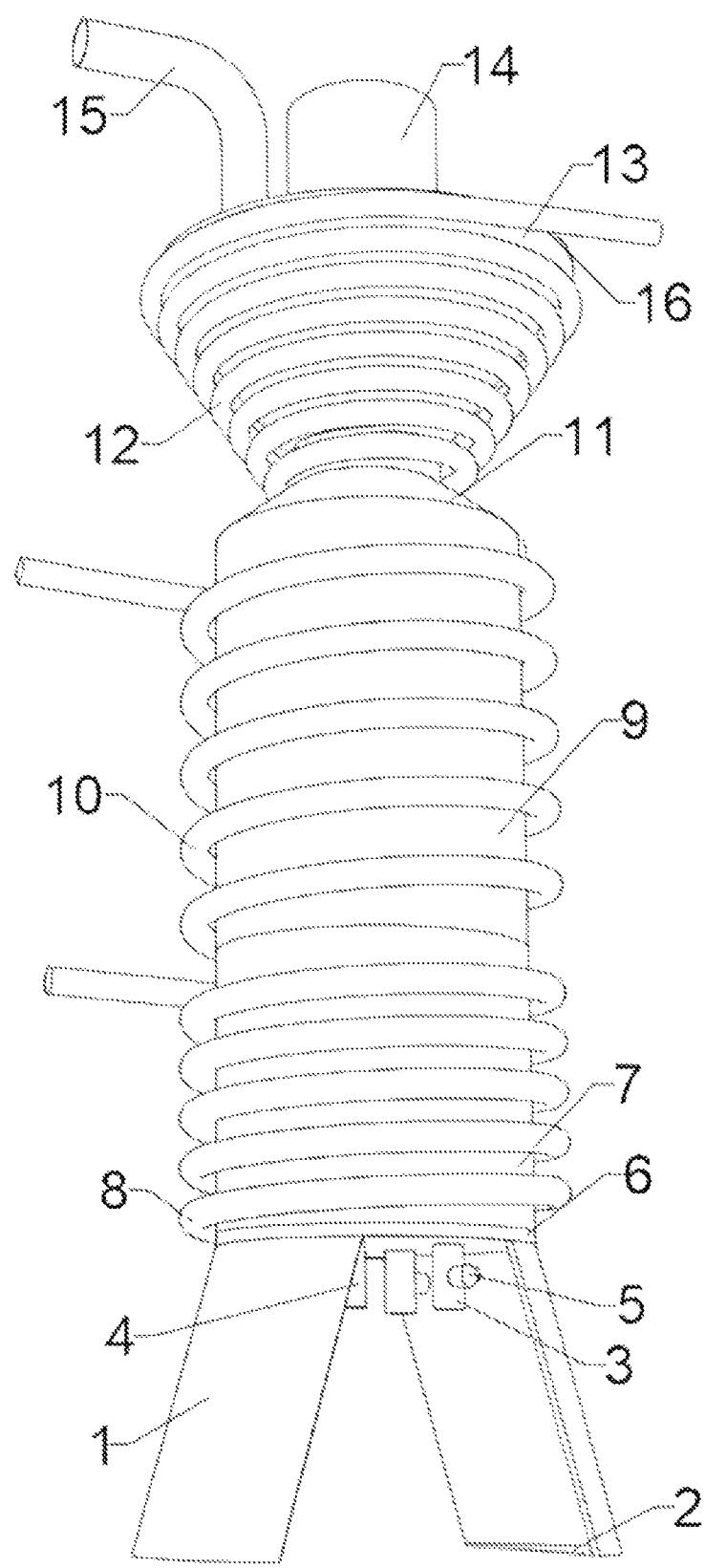
FIG. 1 is a schematic diagram of an overall structure of intelligent temperature control equipment for the preparation of liquid sodium methoxide according to the present invention.

In drawings, reference symbols represent the following components: 1-supporting leg; 2-ballasting plate; 3-air inlet pipe; 4-discharging pipe; 5-electromagnetic valve; 6-bottom temperature box; 7-third shell; 8-third coil; 9-second shell; 10-second coil; 11-shunting hood; 12-first coil; 13-feeding hopper; 14-feeding pipe; 15-air outlet pipe; 16-top plate; 17-corrugated packing; 18-shunting block; 19-vent valve; 20-air inlet hole; 21-throat pipe; 22-motor; 23-blade; 24-first connecting block; 25-water pump; 26-mounting rod; 27-diffusing hood; 28-connecting rod; 29-mounting block; 30-bearing; 31-mounting disc; 32-mounting seat; 33-fastening bolt; 34-mounting lug; 35-electric heating ring; 36-second connecting block; 37-baffle plate;38-arc fan plate; 39-third connecting block; 40-heat dissipation rib; 41-perforated plate; and 42-electric heating film.

DETAILED DESCRIPTION

In order for a person skilled in the art to understand the technical solutions of the present invention more clearly, the present invention will be further explained below in conjunction with the embodiments and the accompanying drawings, but the embodiments of the present invention are not limited to this.

As shown in FIG. 1 to FIG. 4, intelligent temperature control equipment for the preparation of liquid sodium methoxide sequentially includes a feeding hopper 13, a throat pipe 21, a shunting hood 11, a second shell 9 and a third shell 7 which are sequentially connected from top to bottom, wherein a first coil pipe 12, a second coil pipe 10 and a third coil pipe 8 are mounted on the outer sides of the feeding hopper 13, the second shell 9 and the third shell 8, respectively; a discharging pipe 4 is connected to the bottom of the third shell 7, and a plurality of air inlet pipes 3 is mounted on one side of the discharging pipe 4; corrugated packing 17 is disposed on the inner side of the second shell 9; a mounting disc 31 is mounted on the inner side of the third shell 7, and a plurality of water pumps 25 is mounted at the top of the mounting disc 31; a mounting rod 26 is disposed on the inner side of each of the plurality of water pumps 25; a mounting block 29 is rotatably connected to the top of each mounting rod 26; a plurality of umbrella-shaped diffusing hoods 27 is connected to the outer side of each mounting block 29 through connecting rods 28; each shunting hood 27 includes a baffle plate 37 and a plurality of uniformly distributed arc fan plates 38 located at the bottom of the baffle plate 37; and an electric heating film 42 is mounted at the top of each arc fan plate 38. Due to the arrangement of the water pumps 25 and the shunting hoods 27, the water pumps 25 can be used to perform secondary spraying on the mixed solution, and then the mixed solution is dispersively splashed to the lower side of the corrugated packing 17 by the diffusing hoods 27, such that the deficiency that methanol vapor once it leaves the mixed solution cannot undergo a secondary reaction with the mixed solution is solved, thereby increasing a utilization rate of methanol. The sprayed mixed solution can be heated again by disposing the electric heating films 42, thereby ensuring a temperature required for reaction. The third coil 8 is disposed to further maintain the temperature inside the third shell 7, which promotes the stable progress of the reaction.

Figure 2:
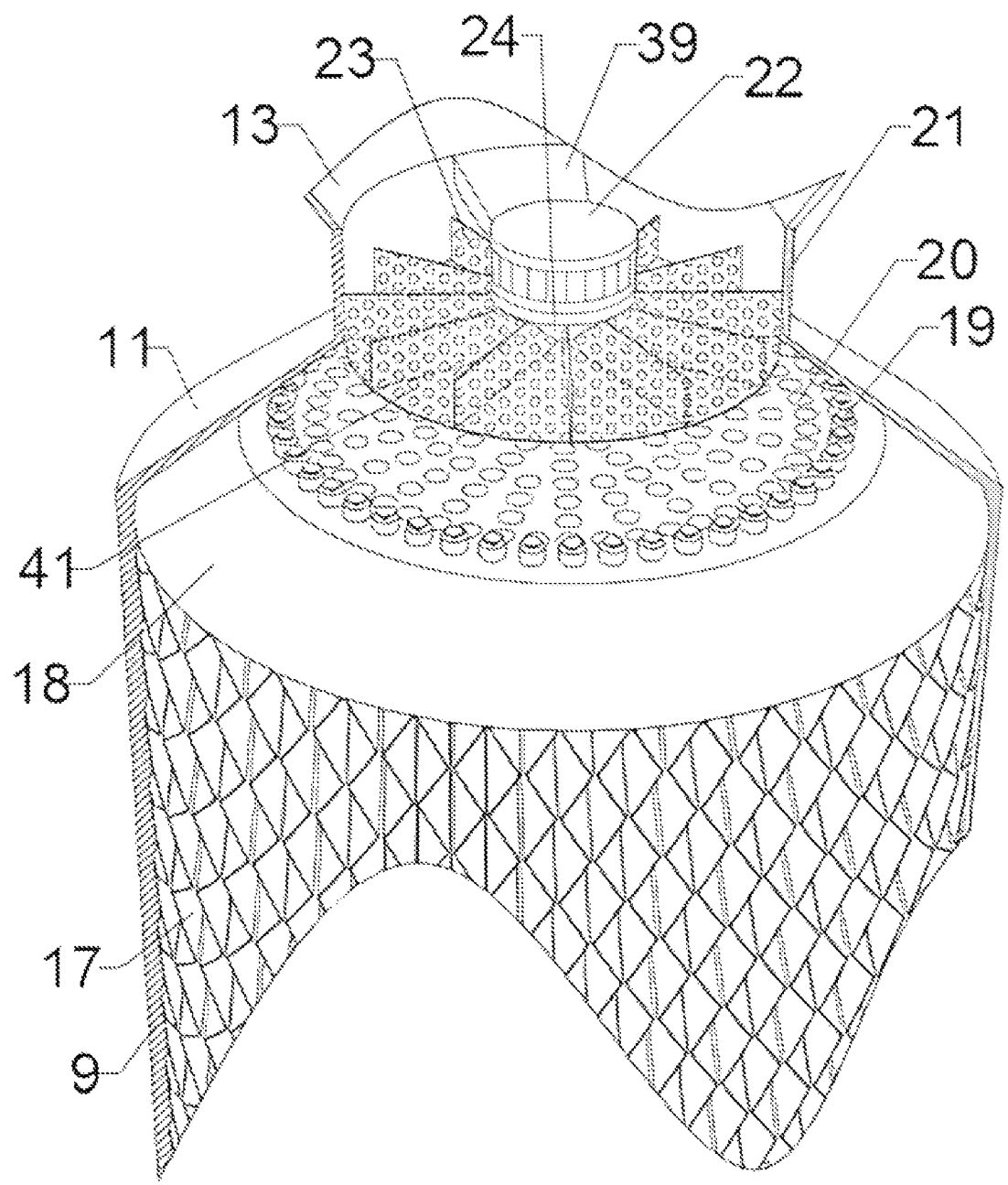
FIG. 2 is a schematic diagram of internal structures of a throat pipe and a shunting hood of the intelligent temperature control equipment for the preparation of liquid sodium methoxide according to the present invention.

In this embodiment, as shown in FIG. 1 and FIG. 2, a bottom temperature box 6 is mounted at the bottom of the third shell 7; the discharging pipe 4 and the air inlet pipes 3 are both disposed to penetrate through the bottom temperature box 6; a plurality of electric heating rings 35 which is located on the outer sides of the air inlet pipes 3 is mounted on the inner side of the bottom temperature box 6; and the electric heating rings 35 are interconnected to the bottom of the inner wall of the bottom temperature box 6 through a plurality of second connecting blocks 36. An electromagnetic valve 5 is respectively mounted on each of the air inlet pipes 3 and the discharging pipe 4. A top plate 16 is mounted on the top of the feeding hopper 13, the corrugated packing 17 is connected to the top of the top plate 16, and an air outlet pipe 15 is disposed on one side of the corrugated packing 17. The inner wall of the feeding hopper 13 is provided with a plurality of evenly distributed annular heat dissipation ribs 40. A motor 22 is mounted on the inner side of the throat pipe 21; the motor 22 is interconnected to the inner wall of the throat pipe 21 through a plurality of third connecting blocks 39; a first connecting block 24 in an inverted circular truncated cone shape is connected to an output end of the motor 22; a plurality of evenly distributed blades 23 is connected to the outer side of the first connecting block 24; a perforated plate 41 is connected to the bottom of each blade 23; and the blades 23 and the perforated plate 41 are each provided with a plurality of uniformly distributed circular holes. A shunting block 18 in a circular truncated cone shape is disposed on the inner side of the shunting hood 11 and tightly clung to the top of the corrugated packing 17; a plurality of evenly distributed shunting pipes is disposed on the inner side of the shunting block 18; a vent valve 19 interconnected with the outermost shunting pipe is disposed at the top of the shunting block 18; and a plurality of evenly distributed liquid inlet holes 20 is formed in the inner side of the vent valve 19. The bottom temperature box 6 is disposed such that a plurality of electric heating rings 35 on the inner side of the bottom temperature box 6 can be used to heat a buffer solution poured into the bottom temperature box 6, and then the bottom of the third shell 7 can be uniformly and continuously maintained at a tower bottom temperature, thereby promoting the reaction progress. The electric heating rings 35 are disposed on the outer side of the air inlet pipe 3, such that the incoming methanol vapor can be heated using the electric heating rings 35, and at the same time the reaction progress can be avoided to be affected by the liquefaction of methanol vapor at low temperature. The second connecting block 36 is disposed to facilitate the fixed installation of the electric heating rings 35 on the inner side of the bottom temperature box 6. The electromagnetic valves 5 are disposed such that the air inlet pipe 3 and the discharging pipe 4 can be switched on and off, thereby facilitating the control over the input of the methanol vapor and the output of the sodium methoxide methanol solution. The top plate 16 is disposed to keep the feeding hopper 13 closed, to prevent safety accidents caused by the leakage of the mixing solution and the methanol vapor. The corrugated packing 17 is disposed such that a reaction raw material solution can be injected into the inner side of the feeding hopper 13 conveniently. The air outlet pipe 15 disposed to discharge incompletely-reacted methanol vapor into methanol purification and refining equipment, thereby facilitating the recovery and utilization of the methanol vapor. The heat dissipation ribs 40 are disposed such that the heat exchange between the inner wall of the feeding hopper 13 and the internal mixed solution is enhanced, which is conducive to maintaining the temperature required for reaction of the mixed solution. The motor 22 is disposed such that a power supply of the motor 22 is switched on to drive the first connecting blocks 24 and then drive the plurality of blades 23 and the perforated plate 41 to rotate, so that the mixed solution is thrown out of the circular holes, thereby achieving a shunting effect. The first connecting blocks 24 are each disposed in an inverted circular truncated cone shape, which can reduce a shunting dead angle on the perforated plate 41 and facilitate improving the shunting uniformity, while the mixed solution is thrown out so that the mixed solution is in a certain degree of overweight state and reacts with the spilled methanol vapor, thereby further increasing the utilization rate of the methanol vapor. The shunting block 18 in the circular truncated cone shape can further expand a shunting area, so that the mixed solution is uniformly shunted to the inner side of the corrugated packing 17. Meanwhile, the vent valve 19 is disposed such that the inner side of the third shell 7 maintains a micro-pressure state, which makes the reaction more complete, and can effectively avoid the problem of low utilization rate of methanol vapor caused by rapid spillage of the methanol vapor. The plurality of air inlet holes 20 is provided such that the mixed solution is shunted to the inner side of the corrugated packing 17 through the shunting pipe and reacts in full contact with the methanol vapor.

Figure 3:
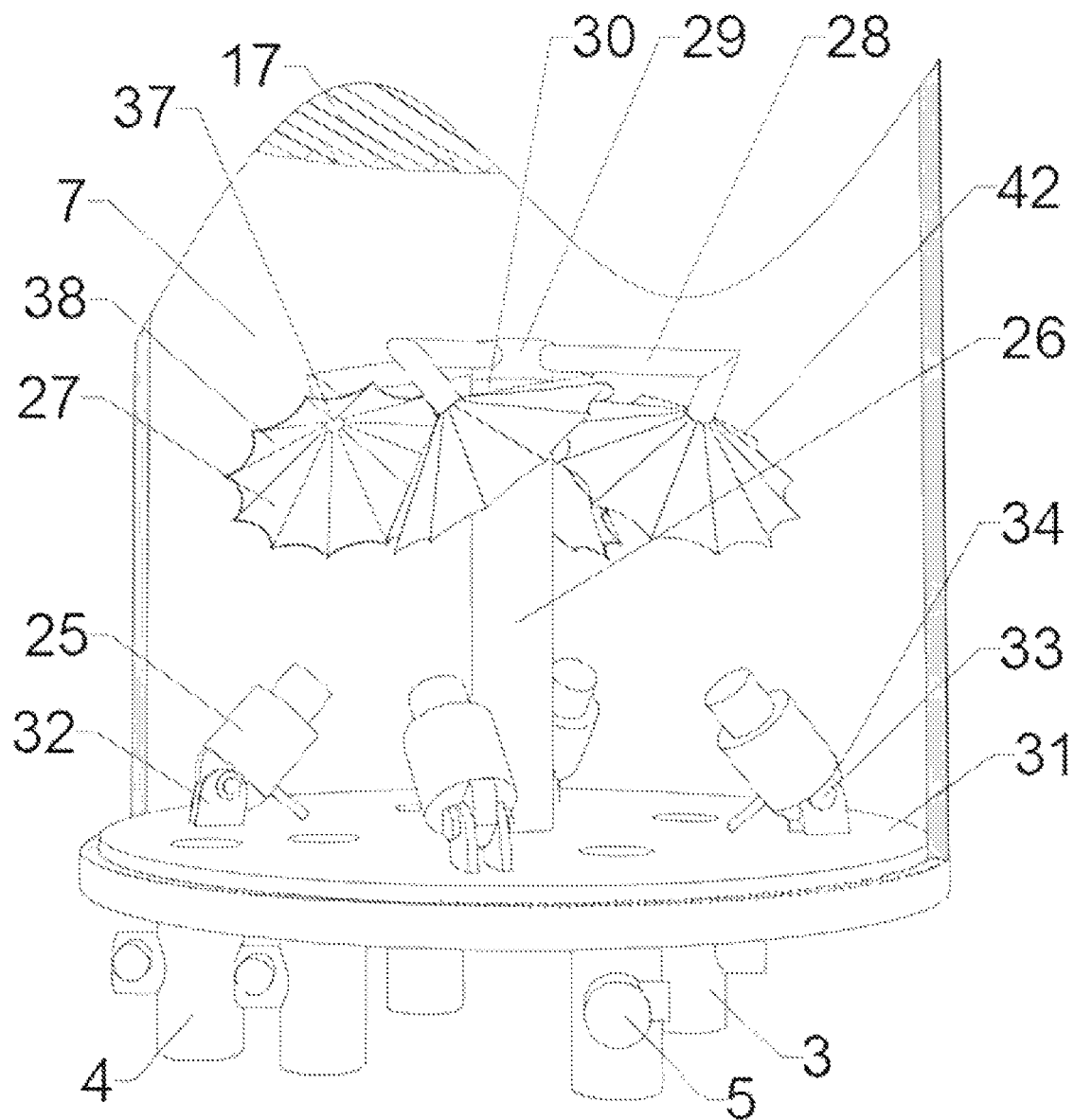
FIG. 3 is a schematic diagram of an internal structure of a third shell of the intelligent temperature control equipment for the preparation of liquid sodium methoxide according to the present invention.
Figure 4:
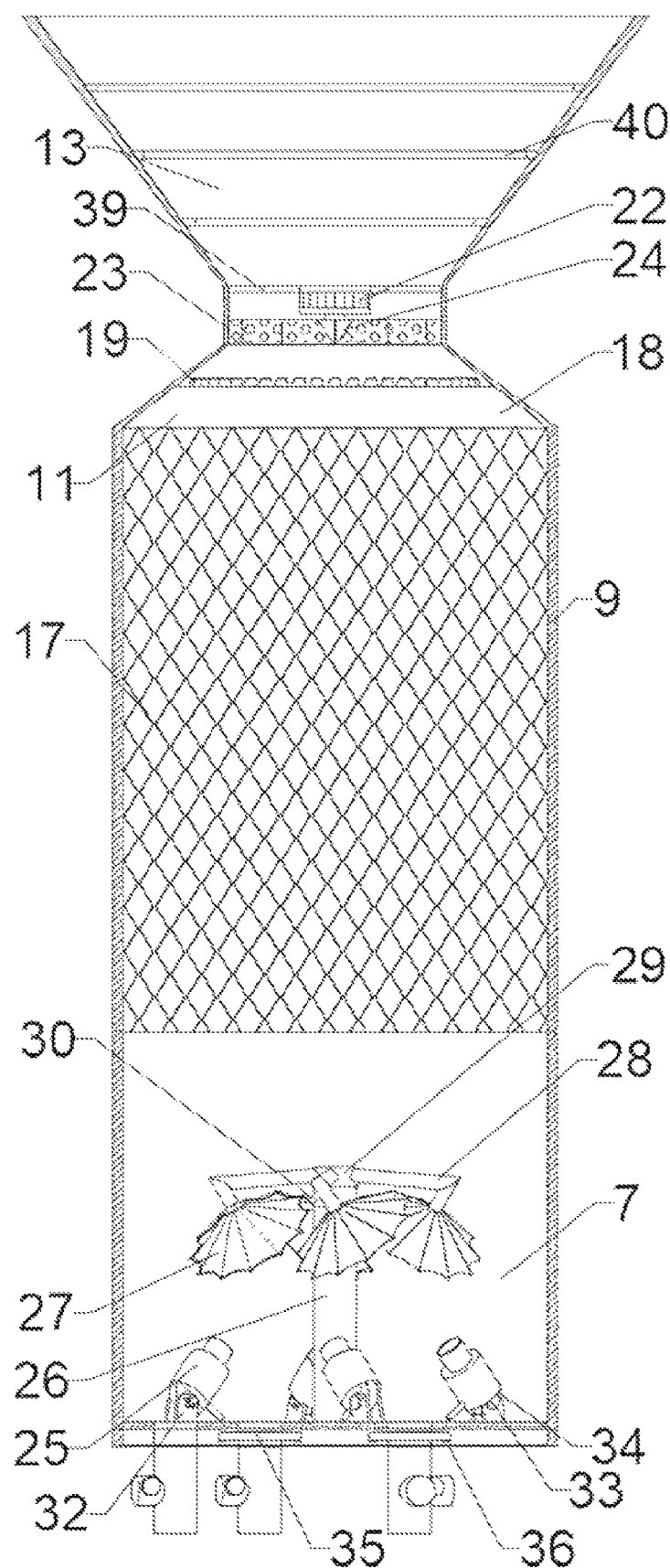
FIG. 4 is a sectional view of internal structures of a first shell, a second shell and the third shell of the intelligent temperature control equipment for the preparation of liquid sodium methoxide according to the present invention.

In this embodiment, as shown in FIG. 3 and FIG. 4, a bearing 30 interconnected to the bottom of the mounting block 29 is mounted on each mounting rod 26. A plurality of supporting legs 1 is mounted at the bottom of the bottom temperature box 6, and a ballasting plate 2 is mounted at the bottom of each supporting leg 1. Mounting lugs 34 are disposed at the bottom of each water pump 25; mounting seats 32 which cooperate with the mounting lugs 34 each other are mounted on the mounting disc 31; and the mounting lugs 34 and the mounting seats 32 are connected to each other through fastening bolts 33. The bearing 30 is disposed to improve the rotation smoothness of the mounting block 29, thereby reducing the loss of kinetic energy of rotation of the mounting block 29 caused by frictional resistance, thereby increasing the rotational speed of the mounting block 29, and promoting a wider splashing range of the mixed solution. The supporting legs 1 are disposed to facilitate the support of the third shell 7 and the second shell 9, providing an operating space for a collected finished product. The ballasting plate 2 is disposed such that a counterweight plate is mounted on the ballasting plate 2, thereby avoiding safety accidents caused by the dumping of the whole device. The mounting lugs 34, the fastening bolts 33 and the electric heating rings 35 are disposed such that the fastening bolts 33 penetrate through the mounting lugs 34 and the electric heating rings 35 and then tightened, thereby achieving the fixation and installation of the motor 25, while providing the convenience to disassemble the water pumps 25 for the maintenance and replacement of the water pumps 25.

In this embodiment, as shown in FIG. 1 to FIG. 4, a working process of intelligent temperature control equipment for the preparation of liquid sodium methoxide provided by this embodiment is as follows:

Step 1: when used, a mixed solution of methanol and sodium hydroxide which are mixed fully is injected into the inner side of the feeding hopper 13 through the feeding pipe 14, a hot medium for maintaining the temperature of the mixed solution is injected through the inner side of the first coil 12, and the heat is transmitted to the mixed solution on the inner side of the feeding hopper 13 through the plurality of heat dissipation ribs 40 on the inner wall of the feeding hopper 13;

Step 2: the power supply of the motor 22 is turned on to drive the first connecting blocks 24 to rotate and then drive the plurality of blades 23 and the perforated plate 41 to rotate, so that the mixed solution is uniformly thrown out and shunted to the inner side of the shunting hood 11, and uniformly discharged into the inner side of the shunting block 18 through the liquid inlet hole 20, and the mixed solution is uniformly distributed on the inner side of the corrugated packing 17 through the plurality of shunting pipes; and Step 3: at the same time, methanol vapor is injected to the inner sides of the third shell 7 and the second shell 9 through the plurality of air inlet pipes 3, and in uniform contact with the mixed solution on the inner side of the corrugated packing 17; a methanol solution of sodium methoxide which is generated in the first reaction and a raw material solution of the incomplete reaction enter the inner side of the third shell 7; at this time, the water pump 25 continuously pumps the mixed solution in the third shell 7 to a position where the baffle plate 37 is located; due to the impact of eccentricity, the mounting block 29 rotates around the mounting rod 26, then the sprayed mixed solution is scattered out and in contact again with the methanol vapor that spills out of the mixed solution to react to form a methanol solution of sodium methoxide; and meanwhile, the electric heating films 42 are electrified to heat the spilled mixed solution and methanol vapor, so that they reach the temperature required for reaction, and the rotation of the plurality of diffusing hoods 27 disturbs the airflow inside the third shell 7, thereby enhancing further heat dissipation from the electric heating films 42.

In summary, according to the intelligent temperature control equipment for the preparation of liquid sodium methoxide in this embodiment, the bottom temperature box 6 is disposed such that a plurality of electric heating rings 35 on the inner side of the bottom temperature box 6 can be used to heat a buffer solution poured into the bottom temperature box 6, and then the bottom of the third shell 7 can be uniformly and continuously maintained at a tower bottom temperature, thereby promoting the reaction progress. The electric heating rings 35 are disposed on the outer side of the air inlet pipe 3, such that the incoming methanol vapor can be heated using the electric heating rings 35, and at the same time the reaction progress can be avoided to be affected by the liquefaction of methanol vapor at low temperature. The second connecting block 36 is disposed to facilitate the fixed installation of the electric heating rings 35 on the inner side of the bottom temperature box 6. The electromagnetic valves 5 are disposed such that the air inlet pipe 3 and the discharging pipe 4 can be switched on and off, thereby facilitating the control over the input of the methanol vapor and the output of the sodium methoxide methanol solution. The top plate 16 is disposed to keep the feeding hopper 13 closed, to prevent safety accidents caused by the leakage of the mixed solution and the methanol vapor. The corrugated packing 17 is disposed such that a reaction raw material solution can be injected into the inner side of the feeding hopper 13 conveniently. The air outlet pipe 15 is disposed to discharge incompletely-reacted methanol vapor into methanol purification and refining equipment, thereby facilitating the recovery and utilization of the methanol vapor. The heat dissipation ribs 40 are disposed such that the heat exchange between the inner wall of the feeding hopper 13 and the internal mixed solution is enhanced, which is conducive to maintaining the temperature required for reaction of the mixed solution. The motor 22 is disposed such that the power supply of the motor 22 is switched on to drive the first connection blocks 24 and then drive the plurality of blades 23 and the perforated plate 41 to rotate, so that the mixed solution is thrown out of the circular holes, thereby achieving a shunting effect. The first connecting blocks 24 are each disposed in an inverted circular truncated cone shape, which can reduce a shunting dead angle on the perforated plate 41 and facilitate improving the shunting uniformity, while the mixed solution is thrown out so that the mixed solution is in a certain degree of overweight state and reacts with the spilled methanol vapor, thereby further increasing the utilization rate of the methanol vapor. The shunting block 18 in the circular truncated cone shape can further expand a shunting area, so that the mixed solution is uniformly shunted to the inner side of the corrugated packing 17. Meanwhile, the vent valve 19 is disposed such that the inner side of the third shell 7 maintains a micro-pressure state, which makes the reaction more complete, and can effectively avoid the problem of low utilization rate of methanol vapor caused by rapid spillage of the methanol vapor. The plurality of air inlet holes 20 is provided such that the mixed solution is shunted to the inner side of the corrugated packing 17 through the shunting pipe and reacts in full contact with the methanol vapor. The bearing 30 is disposed to improve the rotation smoothness of the mounting block 29, thereby reducing the loss of kinetic energy of rotation of the mounting block 29 caused by frictional resistance, thereby increasing the rotational speed of the mounting block 29, and promoting a wider splashing range of mixed solution. The supporting legs 1 are disposed to facilitate the support of the third shell 7 and the second shell 9, providing an operating space for a collected finished product. The ballasting plate 2 is disposed such that a counterweight block is mounted on the ballasting plate 2, thereby avoiding safety accidents caused by the dumping of the whole device. The mounting lugs 34, the fastening bolts 33 and the electric heating rings 35 are disposed such that the fastening bolts 33 penetrate through the mounting lugs 34 and the electric heating rings 35 and then tightened, thereby achieving the fixation and installation of the motor 25, while providing the convenience to disassemble the water pumps 25 for the maintenance and replacement of the water pumps 25.

The above are only further embodiments of the present invention, but the protection scope of the present invention is not limited thereto. Within the scope disclosed in the present invention, any equivalent modifications or replacements may be easily derived by a person skilled in the art shall fall within the protection scope of the present invention.

The invention claimed is:

1. Intelligent temperature control equipment for the preparation of liquid sodium methoxide, sequentially comprising a feeding hopper (13), a throat pipe (21), a shunting hood (11), a second shell (9) and a third shell (7) which are sequentially connected from top to bottom, wherein a first coil pipe (12), a second coil pipe (10) and a third coil pipe (8) are mounted on the outer sides of the feeding hopper (13), the second shell (9) and the third shell (8), respectively; a discharging pipe (4) is connected to the bottom of the third shell (7), and a plurality of air inlet pipes (3) is mounted on one side of the discharging pipe (4); corrugated packing (17) is disposed on the inner side of the second shell (9); a mounting disc (31) is mounted on the inner side of the third shell (7), and a plurality of water pumps (25) is mounted on the top of the mounting disc (31); a mounting rod (26) is disposed on the inner side of each of the plurality of water pumps (25); a mounting block (29) is rotatably connected to the top of each mounting rod (26); a plurality of umbrella-shaped diffusing hoods (27) is connected to the outer side of each mounting block (29) through a connecting rod (28); each diffusing hood (27) includes a baffle plate (37) and a plurality of uniformly distributed arc fan plates (38) located at the bottom of the baffle plate (37); and an electric heating film (42) is mounted at the top of each arc fan plate (38).

2. The intelligent temperature control equipment for the preparation of liquid sodium methoxide according to claim 1, wherein a bottom temperature box (6) is mounted at the bottom of the third shell (7); the discharging pipe (4) and the air inlet pipes (3) are both disposed to penetrate through the bottom temperature box (6); a plurality of electric heating rings (35) which is located on the outer sides of the air inlet pipes (3) is mounted on the inner side of the bottom temperature box (6); and the electric heating rings (35) are mutually connected to the bottom of the inner wall of the bottom temperature box (6) through a plurality of second connecting blocks (36).

3. The intelligent temperature control equipment for the preparation of liquid sodium methoxide according to claim 1, wherein an electromagnetic valve (5) is respectively mounted on each the air inlet pipes (3) and the discharging pipe (4).

4. The intelligent temperature control equipment for the preparation of liquid sodium methoxide according to claim 1, wherein a top plate (16) is mounted at the top of the feeding hopper (13), a feeding pipe (14) is communicated with the feeding hopper (13), and an air outlet pipe (15) is disposed on one side of the feeding pipe (14).

5. The intelligent temperature control equipment for the preparation of liquid sodium methoxide according to claim 1, wherein the inner wall of the feeding hopper (13) is provided with a plurality of evenly distributed annular heat dissipation ribs (40).

6. The intelligent temperature control equipment for the preparation of liquid sodium methoxide according to claim 1, wherein a motor (22) is mounted on the inner side of the throat pipe (21); the motor (22) is interconnected to the inner wall of the throat pipe (21) through a plurality of third connecting blocks (39); a first connecting block (24) in an inverted circular truncated cone shape is connected to an output end of the motor (22); a plurality of evenly distributed blades (23) is connected to the outer side of the first connecting block (24); a perforated plate (41) is connected to the bottom of each blade (23); and the blades (23) and the perforated plate (41) are each provided with a plurality of uniformly distributed circular holes.

7. The intelligent temperature control equipment for the preparation of liquid sodium methoxide according to claim 1, wherein a shunting block (18) in a circular truncated cone shape is disposed on the inner side of the shunting hood (11) and tightly clung to the top of the corrugated packing (17); a plurality of evenly distributed shunting pipes is disposed on the inner side of the shunting block (18); and a vent valve (19) interconnected with the outermost shunting pipe is disposed on the top of the shunting block (18); and a plurality of evenly distributed liquid inlet holes (20) is formed in the inner side of the vent valve (19).

8. The intelligent temperature control equipment for the preparation of liquid sodium methoxide according to claim 1, wherein a bearing (30) interconnected to the bottom of the mounting block (29) is mounted on the mounting rod (26).

9. The intelligent temperature control equipment for the preparation of liquid sodium methoxide according to claim 2, wherein a plurality of supporting legs (1) is mounted at the bottom of the bottom temperature box (6), and a ballasting plate (2) is mounted at the bottom of each supporting leg (1).

10. The intelligent temperature control equipment for the preparation of liquid sodium methoxide according to claim 1, wherein mounting lugs (34) are disposed at the bottom of each water pump (25); mounting seats (32) which cooperate with the mounting lugs (34) each other are mounted on the mounting disc (31); and the mounting lugs (34) and the mounting seats (32) are connected to each other through fastening bolts (33).

\* \* \* \* \*